Jan. 19, 1954
J. E. STORMENT
2,666,730
DEWAXING PROCESS
Filed Oct. 24, 1951
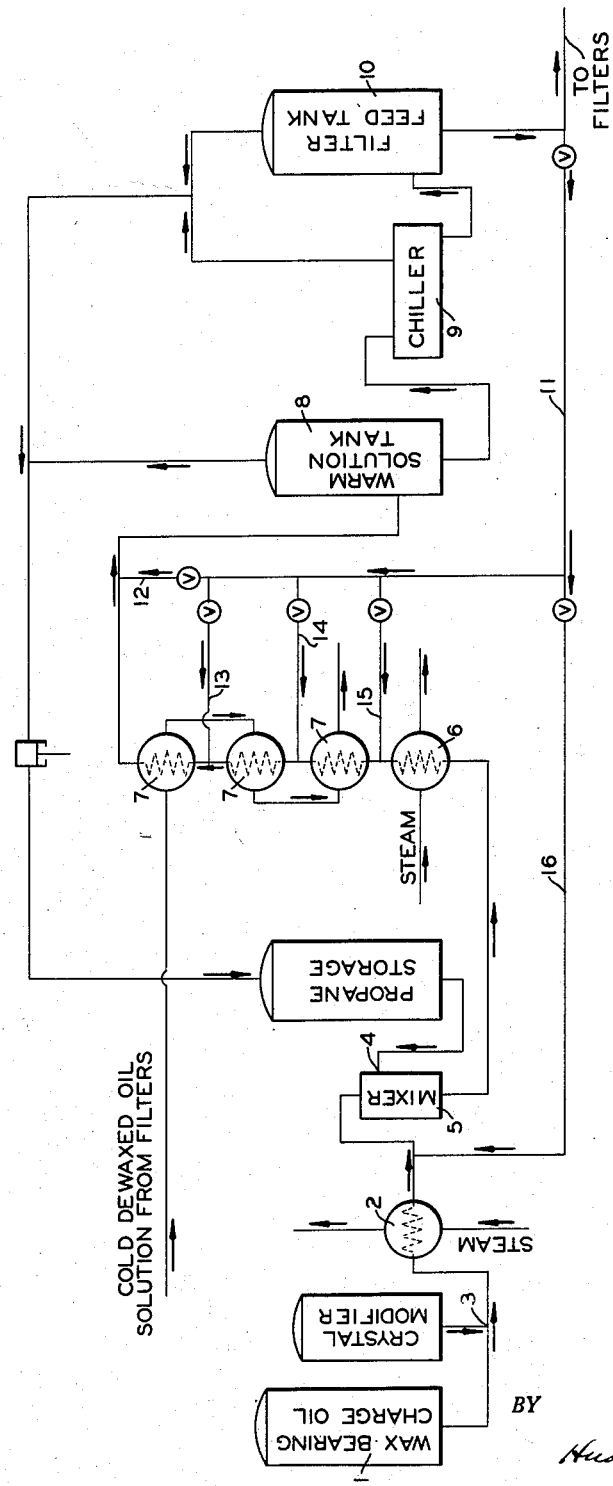
INVENTOR.
J. E. STORMENT
BY
Hudson and Young
ATTORNEYS Patented Jan. 19, 1954

2,666,730

UNITED STATES PATENT OFFICE 2,666,730

DEWAXING PROCESS

Joseph E. Storment, Kansas City, Mo., assignor to Phillips Petroleum Company, a corporation of Delaware Application October 24, 1951, Serial No. 252,956

9 Claims. (Cl. 196—18)

This invention relates to dewaxing of hydrocarbon oils. In one of its aspects the invention is concerned with maintaining filter rates or the restoration of filter rates without resort to external solvent or even solvent as such within the process.

In the solvent dewaxing of hydrocarbon oils, the filter rate determines the throughput of the plant and is therefore of the utmost importance. The filter rate is dependent primarily upon wax crystal structure which in turn is affected by several factors such as mixing temperatures, chilling rates, solvent to oil ratio, the properties of the oil, etc. In many cases crystal modifiers are used to improve or modify the wax crystal structure so as to give a more porous filter cake and thereby increase the filter rate.

Frequently, however, even when using crystal modifiers, the filter rate will decrease in a short period of time to values far below normal and in some extreme cases filtration practically stops. The cause of these low filter rates is not always easily determined. In fact in some cases with the same oil stock, the same chilling rates, the same solvent-oil ratios, the same filtering temperatures and apparently with the other operating conditions the same the filter rate may be normal at one time and below normal at another.

I have found that when these periods of low filter rate occur for no apparent reason, the filter rate can be restored to normal values, and frequently to values above normal, by recycling a portion of the chilled filter feed back to some point in the system ahead of the final chiller. The amount to be recirculated varies and in most cases should be held to a minimum since each barrel of mixture recirculated backs out a barrel of fresh mixture. However, even under these conditions, it is advantageous to use my method of recirculation which will restore the filter rate in a short period of time compared to the time required for the system to right itself unaided. In some instances with low filter rates, it has been necessary to shut down and completely flush the system. My method of recirculation eliminates these difficulties.

The attached diagrammatic drawing illustrates an application of my invention. Wax bearing charge oil from 1 is passed through heater 2 where it is heated to approximately 180–210° F. to destroy the previous crystalline history of the wax. From 0.05 to 0.4% of a crystal modifier is added at 3 and from 0.6 to 3 volumes of propane per volume of oil is added at 4. The amount of crystal modifier and propane used varies with the viscosity of the waxy oil. The mixture is then passed through mixer 5 and heater 6 to insure thorough mixing. The mixture leaves heaters 6 at a temperature of approximately 175° F. and is passed through heat exchangers 7 where it is cooled to 100–115° F. and passed to warm solution tank 8. From warm solution tank 8 the mixture flows to chiller 9 where a reduction in pressure causes evaporation of part of the propane solvent and the solution is chilled to −30 or −50° F. Propane evaporated in the chillers is replaced by propane from dry storage (not shown).

From filter feed tank 10 the charge solution normally flows to the filters (not shown). However in periods of low filter rate a portion of the charge solution is recirculated through line 11 and injected into the system through one or more of lines 12, 13, 14, 15 or 16 as desired. Usually line 16 is the preferred point of injection. Thus, it is especially noted, as being important in the now preferred point of injection choice, that, according to the invention, the cold filter feed is added to a relatively hot stream of oil, which may contain some propane, but which in the drawing described here does not contain propane, to cause in said oil at an elevated temperature locally an almost instantaneous or sudden chilling. The amount circulated will vary from 25 to 75 per cent of the original charge solution.

Example I

90 B./H. of a SAE 250 wax bearing lube oil stock from a Mid-Continent crude oil was charged and heated as previously described to 200° F. 0.4% of a crystal modifier and 180 B./H. of propane were added to give a total solution of 270 B./H. The solution was thoroughly mixed and heated to 165° F. as described above. The solution was then cooled by heat exchange to 118° F. and chilled by auto refrigeration to −40° F. at a rate of approximately 4 degrees per minute. The filtering rate was 270 barrels per hour. The solution was filtering normally when, for some reason, the filter rate decreased to the point where only 65 B./H. of fresh oil was being charged. Recirculation of chilled solution to the system ahead of the propane-oil mixer was started at a rate of approximately 65 B./H. Corresponding reductions were made in the amounts of fresh oil and propane solvent being charged. In making these reductions, the original solvent to oil ratio on the fresh mixture was maintained. During this recycling operation the temperature of the effluent from heater 6 was approximately 125° F. instead of approximately 165° F. prior to starting the recycle. Likewise the effluent from heat exchangers 7 was approximately 105° F. instead of the 118° F. prior to starting the recycle. In approximately 40 minutes a definite improvement in filter rate was noted. After approximately 60 minutes, it was possible to start decreasing the amount of solution being circulated until at the end of approximately 90 minutes recirculation was stopped and the original filter rate, 270 B./H. of fresh solution was easily maintained.

From the example it is seen that the filter rate having dropped to 195 barrels per hour of fresh solution from 270 barrels per hour was re-established in about 60 minutes' time, recirculation of the chilled filter feed could be stopped in 90 minutes and all this was done without resort to external solvent or internal solvent as such. Indeed, it is surprising to find that recirculation of low filtering rate material, as described, would result in re-establishment of the original filter rate.

*Example II*

115 B./H. of a SAE 20 wax bearing lube oil stock prepared from a mixture of West Texas and Mid-Continent topped crude oils by vacuum distillation, and phenol solvent extraction was charged and heated as previously described to 210° F. in order to destroy the previous crystalline history of the wax. 0.16 per cent of a crystal modifier and 150 B./H. of propane were added to give a total solution of 265 B./H. The solution was thoroughly mixed and heated to 151° F. by exchange with steam in the heater 6. The solution was cooled in heat exchangers 7 with cold dewaxed oil solution to 102° F. and then chilled by auto refrigeration to −35° F. at a rate of approximately 4 degrees per minute. The filter feed rate was 265 barrels per hour. The solution was filtering normally when for some reason the filter rate decreased to the point where only 68 B./H. of fresh oil was being charged. Recycle of chilled solution from the filter feed charge tank to a point in the system ahead of the propane-oil mixer, and prior to the point of clean propane solvent addition, was started at a rate of 91 B./H. Corresponding reductions were made in the amounts of fresh oil and propane solvent being charged. In making these reductions, the original solvent to oil ratio on the fresh mixture was maintained. During this recycling operation, the temperature of the effluent from heater 6 was approximately 108° F. instead of the 151° F. prior to starting the recycle. Likewise the effluent from heat exchangers 7 was approximately 85° F. instead of the 102° F. prior to starting the recycle. In approximately 30–40 minutes a definite improvement in filter rate was noted. After approximately 60 minutes, it was possible to start decreasing the amount of solution being circulated until at the end of approximately 90 minutes recirculation was stopped and a filter rate of 213 B./H. of fresh solution was easily maintained. The fresh solution charge rate was not raised to its original value of 265 barrels per hour immediately following cessation of recycling because of a desire to observe the filtering characteristics of the fresh solution for a few hours prior to raising the charge. In this case, the filtering characteristics were as good or better than before the filtering trouble occurred and the charge was raised after a few hours' operation.

Reasonable variation and modification are possible within the scope of the foregoing disclosure and the appended claims to the invention the essence of which is that by recirculating a portion of an improperly filtering chilled filter feed in a hydrocarbon oil dewaxing process to a point prior to the chilling step, preferably to a point prior to the addition of any solvent to the oil, while it is at an elevated temperature to cause locally therein a sudden chilling, the characteristics of the ultimately obtained chilled filter feed can be altered thus to maintain or to re-establish the original desired filter feed rate. It will be understood that according to the invention both intermittent and continuous recycle of chilled filter feed can be practiced in this manner to substantially avoid any loss of filter feed rate. Or, as described, the recycling step of the invention can be practiced when some loss in filter feed rate has indicated that something has gone wrong with the filtering characteristics of the wax.

It is not known just why the step which forms the basis of the present invention will maintain or restore desirable filter feed rates but it is clear that the invention is applicable to those situations of loss of filter feed rate which occur for no apparent reason when all other operating conditions remain the same as these were when satisfactory filter feed rates were being obtained. Finally, as stated, it is of importance to note that according to this invention the solution which is recycled is known to contain wax crystals apparently of such structure that they will not filter properly.

I claim:

1. In a hydrocarbon oil dewaxing operation in which the oil is mixed with a solvent and then chilled prior to a wax filtering operation and wherein the filter rate tends to decrease for no apparent reason, the step of causing normal desirable filter feed rate which comprises recycling a portion of the chilled filter feed to a point in the operation immediately preceding the admixture of solvent and immediately admixing said oil and filter feed mixture with solvent ahead of the chilling step.

2. A process according to claim 1 wherein the solvent is propane.

3. A process for dewaxing a wax bearing charge oil which comprises the steps of heating a wax bearing charge oil to a temperature sufficient to destroy its crystalline history, admixing said oil with a suitable solvent, cooling and chilling said solution, recycling a portion of said chilled solution to a point in the operation after said heating step and which is prior to the admixture of the said oil with said solvent, and filtering the remainder of said chilled solution.

4. A process according to claim 3 wherein the solvent is propane.

5. The dewaxing of an SAE 250 wax bearing lube oil stock obtained from a Mid-Continent crude oil which comprises heating said stock to a temperature of 200° F., adding a minor amount of a crystal modifier thereto, then adding propane in quantities sufficient to obtain complete solution upon reheating to a temperature of about 165° F., cooling said mixture and then chilling by propane evaporation to about −40° F. at an approximate rate of 4 degrees per minute, filtering until the original filtering rate has decreased substantially, then recirculating some of the chilled filter material being filtered to a point in the operation after said first heating step but ahead of the admixture of the said oil with the said propane and continuing said recirculation until the original filter rate has been re-established.

6. A process according to claim 5 wherein there is used for each 90 barrels of oil about 180 barrels of propane, the feed rate to the filter is about 270 barrels per hour, the lowering of feed rate experienced is about 65 barrels per hour (filter feed rate is approximately equal to 195 barrels per hour) and the quantity of chilled filter feed recirculated is approximately 75 barrels per hour.

7. The dewaxing of a SAE 20 wax-bearing lube oil stock obtained from a mixture of West Texas and Mid-Continent top crude oils by vacuum distillation and phenol solvent extraction which comprises heating said stock to a temperature of 210° F., adding a minor quantity of a crystal modifier thereto, then adding propane in quantities sufficient to obtain complete solution upon reheating to a temperature of 151° F., cooling said mixture and then chilling by auto refrigeration to a temperature of −35° F. at an approximate rate of 4 degrees per minute, filtering until the original filtering rate has decreased substantially, then recirculating some of the chilled filter feed being filtered to a point in the operation after said first heating step but ahead of the said admixture of said oil with the said propane and continuing said recirculation until the original filter rate has been established.

8. A process according to claim 7 wherein there is used for each 115 barrels of oil about 150 barrels of propane, the feed rate to the filter is about 265 barrels per hour, and the lowering of said rate experienced is 108 barrels per hour (filter feed rate is approximately equal to 157 barrels per hour) and the quantity of chilled filter feed recirculated is approximately 91 barrels per hour.

9. In the dewaxing of a hydrocarbon oil which has been prepared for a filtering operation and to which solvent has been added and the mixture of solvent and oil thus obtained has been chilled and which mixture apparently is suitable for filtration but which tends to be unsuitable for filtration at a proper filter feed rate, the step of cycling at least a portion of said unsuitable oil, as prepared for filtering, to the preparation for filtering operation.

JOSEPH E. STORMENT.

References Cited in the file of this patent

UNITED STATES PATENTS

| Number | Name | Date |
|---|---|---|
| 2,248,498 | Gross et al. | July 8, 1941 |
| 2,463,845 | Backlund et al. | Mar. 8, 1949 |
| 2,486,014 | Evans | Oct. 25, 1949 |
| 2,584,966 | Reeves | Feb. 5, 1952 |